US012423625B2

(12) United States Patent
Marcourt et al.

(10) Patent No.: US 12,423,625 B2
(45) Date of Patent: Sep. 23, 2025

(54) DISTRIBUTED COMPUTER SYSTEM FOR DELIVERING DATA

(71) Applicant: Amadeus S.A.S., Biot (FR)

(72) Inventors: Pierre Marcourt, Antibes (FR); Antoine Chenet, Grasse (FR); David Jelley, Tewksbury, MA (US); Ferran Pons Minguell, Antibes (FR); Cecilia Genoveva Vargas Perez, Dallas, TX (US)

(73) Assignee: Amadeus S.A.S., Biot (FR)

( * ) Notice: Subject to any disclaimer, the term of this patent is extended or adjusted under 35 U.S.C. 154(b) by 467 days.

(21) Appl. No.: 17/568,763

(22) Filed: Jan. 5, 2022

(65) Prior Publication Data

US 2022/0215299 A1    Jul. 7, 2022

(30) Foreign Application Priority Data

Jan. 6, 2021    (EP) .................................... 21305012

(51) Int. Cl.
*G06Q 10/02* (2012.01)
*G06Q 20/04* (2012.01)

(52) U.S. Cl.
CPC ........... *G06Q 10/02* (2013.01); *G06Q 20/045* (2013.01)

(58) Field of Classification Search
CPC .. G06Q 10/02; G06Q 20/045; G06Q 30/0601; G06Q 50/14
See application file for complete search history.

(56) References Cited

U.S. PATENT DOCUMENTS

| 2015/0120344 A1* | 4/2015 | Rose .................. G06Q 30/0631 705/5 |
| 2017/0177575 A1 | 6/2017 | Florimond et al. |

(Continued)

FOREIGN PATENT DOCUMENTS

WO    2020030539 A1    2/2020

OTHER PUBLICATIONS

De Carlos et al., "The new intermediaries of tourist distribution: Analysis of online accommodation booking sites," The International Journal of Management Science and Information Technology (IJMSIT), vol. 19, 39-58 (Year: 2016).*

(Continued)

*Primary Examiner* — Resha Desai
*Assistant Examiner* — Patrick Kim
(74) *Attorney, Agent, or Firm* — Thompson Hine LLP

(57) ABSTRACT

Distributed computer system with an application server and an auxiliary server for processing a group transaction with entities in the group. The group transaction, requiring a target value to be received, includes first and second transactions. The application server is configured to receive the first transaction including a first value, interface the auxiliary server to create and access a temporary file to store the first value in which temporary file is associated with the group transaction, receive the second transaction including a second value after the first transaction in which the second value to reach a target value when combined with the first value, and receive identification information associated with the group transaction for each group entity independently from the first and second transactions. In response to receiving the first and second values as well as the identification information for each group, designated files are issued for each entity.

14 Claims, 9 Drawing Sheets

(56) References Cited

U.S. PATENT DOCUMENTS

2018/0211189 A1* 7/2018 Bessassi .............. G06Q 10/025
2019/0066002 A1* 2/2019 Bayer ................... G06Q 50/14
2020/0050976 A1* 2/2020 Lowe ................... G06Q 20/102
2021/0312529 A1  10/2021 Malparty et al.

OTHER PUBLICATIONS

EP, European Patent Office, Extended Search Report and Written Opinion issued in Patent Application No. 21305012.3, 9 pages (Jun. 18, 2021).

* cited by examiner

DISTRIBUTED COMPUTER SYSTEM FOR DELIVERING DATA

FIELD OF THE INVENTION

The present disclosure generally relates to a distributed computer system for the handling of group transactions and related methods and computer program products.

BACKGROUND

WO 2020/030539 A1 pertains to a method of controlling updates to booking data corresponding to purchasable products inducing, at an intermediate server connected with a booking server: obtaining and storing purchase initiation data including a transaction identifier, transmitting a request for product definitions to the booking server, according to the purchase initiation data; generating an interactive message containing selectable product definition data, and transmitting the interactive message according to the client addressing identifier; receiving a product selection, responsive to selection of the product definition data in the interactive message at a client device; and generating a purchase instruction corresponding to the product definition and sending the purchase instruction to the booking server causing the booking server to update the booking data to reflect a purchase corresponding to the client addressing identifier.

SUMMARY

According to first aspect, a distributed computer system for processing a group transaction for a group of a plurality of entities is provided. The group transaction comprises at least one first transaction and at least one second transaction and wherein the group transaction requires a target value to be received. The distributed computer system comprises: an application server and an auxiliary server. The application server is configured to receive the at least one first transaction including a first value and to interface with the auxiliary server to create and access a temporary file to store the first value, wherein the temporary file is associated with the group transaction. The application server is further configured to receive the at least one second transaction including a second value after the first transaction has been received; the second value of the at least one second transaction being a value to reach a target value when combined with the first value of the at least one first transaction. The application server is to receive identification information for each entity comprised by the group independently from the first transaction and second transaction, the identification information being associated with the group transaction. In response to receiving the first value and the second value as well as the identification information for each entity comprised by the group, the application server is to create and issue designated files for each entity of the group transaction.

According to a second aspect, a method of processing a group transaction is provided. The group comprises a plurality of entities, wherein the group transaction comprises at least one first transaction and at least one second transaction and wherein the group transaction requires a target value to be received. The method of processing a group transaction comprises receiving the at least one first transaction including a first value and interfacing with an auxiliary server to create and access a temporary file to store the first value, wherein the temporary file is associated with the group transaction. The method further comprises receiving at least one second transaction including a second value after the first transaction has been received; the second value of the at least one second transaction being a value to reach a target value when combined with the first value of the at least one first transaction; receiving identification information for each entity comprised by the group, independently from the first transaction and second transaction, the identification information being associated with the group transaction; and in response to receiving the first value and the second value as well as the identification information for each entity comprised by the group, creating and issuing designated files for each entity of the group transaction.

According to a third aspect, a computer program product comprising program code instructions stored on a computer readable medium to execute the method steps according to the second aspect, when said program is executed on a computer, is provided.

According to a first aspect, a distributed computer system for processing a group transaction for a group of a plurality of entities is provided. The group transaction could be e.g. an authentication request issued by a group of interconnected mobile devices, a group booking process of passengers or the like. Correspondingly the entities of the group would be mobile network devices or a group of passengers etc.

The group transaction comprises at least one first transaction and at least one second transaction and wherein the group transaction requires a target value to be received.

To provide an example, the group authentication request by the group of mobile devices could involve a two-factor authentication, in which a first codeword (corresponding to the first transaction) from a first group entity could be received. Later a second codeword (corresponding to the second transaction) could be received which has to match a criterion (target value) together with the first codeword. For a group booking of passengers, a deposit payment (first transaction) for passengers could be first required and then a balancing payment (second transaction) which meets a target value (total amount for e.g. a ticket to be paid) together with the deposit payment.

The distributed computer system comprises an application server and an auxiliary server. The application server may be any server that is capable of processing an application involved in processing the first and second transaction(s).

The application server is configured to receive the at least one first transaction including a first value. The first value include in the first transaction could be, a first codeword for a two-factor authentication in the example of a group of mobile devices. In said other example of a group of passengers the deposit amount to be paid via a deposit transaction could correspond to said first value.

The application server is to interface with the auxiliary server to create and access a temporary file to store the first value, wherein the temporary file is associated with the group transaction;

The auxiliary server may be any server that is capable of assisting the application server in carrying out the group transaction. The temporary file could be a simple file, a logical container or the like for data of the type received as the first value along the at least one first transaction.

The temporary file, in this way may store a certain codeword or other cryptographic information received as the first value or may hold a certain amount of money, e.g. a deposit amount for a booking transaction. The temporary file is associated with the group transaction for being able to handle a plurality of group transactions with different first and second transactions and to find the correct temporary file on which the first value of the corresponding group transaction is stored.

The application server is to receive the at least one second transaction including a second value after the first transaction has been received. The second value of the at least one second transaction is a value to reach a target value when combined with the first value of the at least one first transaction. As sketched above, there is a criterion which the first value from the first transaction and the second value from the second transaction have to fulfil. This criterion may correspond to a threshold that has to be reached or exceeded, to a cryptographic pass criterion or the like. To fulfil the target, the first value from the temporary file stored on the auxiliary server may be used to be combined with the second value.

The application server is further to receive identification information for each entity comprised by the group independently from the first transaction and second transaction, the identification information being associated with the group transaction. The identification information corresponds to an identity received for each group entity. The identity may correspond to an IP address or the like in the example of a two-factor authentication of mobile devices or the identity may correspond to a passenger name received in the example of a group booking for passengers (e.g., of a flight).

The application server is further to, in response to receiving the first value and the second value as well as the identification information for each entity comprised by the group, create and issue designated files for each entity of the group transaction. The designated files for each entity of the group may correspond to flight tickets for each passenger in the example of a group flight bookings or to permit files for each entity in the example of a two-factor authentication for a group of mobile devices.

In some examples, the application server is configured to receive separate partial transactions as first transactions by entities of the group to cover the first value step by step. As such, there can be more than one first transaction to cover the first value. However, a single first transaction to cover the first value is possible as well. In examples, in which there are two or more first transaction with corresponding first values, the application server is configured to call the auxiliary server to update the first value stored in the temporary file step by step. As such, the first value stored in the temporary file may be increased after each first value received by successive first transactions.

In the example of a group of mobile devices being involved in a two-factor authentication, the above-mentioned first codeword may be transmitted in steps to the application server and also stored and/or aggregated in steps in the temporary file on the auxiliary server. In the example of a group booking for e.g. a flight, the first transactions may correspond to partial deposit payments including partial deposit amounts as first values, wherein the partial deposit amounts are stored and/or aggregated on the temporary file on the auxiliary server.

In some examples, the temporary file stores a history of the values received via the partial transactions along with the date of the partial transactions and a type of transaction performed. The origin of the transaction, hence, which entity of a group issued the transaction may be recorded in the temporary file, as well. These information in the temporary file enables, e.g. the application server, when accessing it from the auxiliary server, to trace back the transactions or to check whether the transactions received are consistent. This may reduce the susceptibility of the group transaction system to fraudulent transactions, since inconsistent transactions can then be isolated and further analysed.

When the field of application is a passenger group booking, the above-mentioned stored information in the temporary file, for example, helps the group booking application to recognize an excess payment or a late payment. Since the form of payment, as an example for a type of transaction, is, for example, also recorded there, a refund of a deposit to a certain passenger who paid too much or is not able to attend e.g. the booked flight could be carried out using right the form of payment that was used to pay the deposit amount by that corresponding passenger.

In some examples, the temporary file contains a dedicated storage object for the first value. The dedicated storage depends on the field of application of the group transaction method described herein. For a security related application, for example, for the storage of the above-mentioned first codeword, the dedicated storage object is, for example, a temper-resistant memory. For the example of a group booking involving a deposit payment, the dedicated storage object may be a dedicated account or a voucher object to hold the deposit payment.

In some examples, an association between the temporary file and the respective group transaction is stored in a group file on the application server. The group file stores, for example, relevant information pertaining to the group booking. Such a relevant information is, which temporary file on the auxiliary server belongs to which group transaction. This information prevents false alignments in cases in which a plurality of group transactions using different temporary files on the auxiliary server are performed. The group file may, for example, store payment limits, time limits up to which certain payments have to be received, if the first value is a corresponding deposit payment. The group file may also store other constraints, such as time limits for receiving a certain security related transaction or the like. The group file may be used to monitor constrains regarding the first (and second) transactions.

In some examples, when a split of the group is intended, at least one group file on the application server and at least one temporary file on the auxiliary server are adapted according to the intended split of the group. A split of the group may be the result of an external split group request. Two different examples of how to adapt the at least one group file on the application server and the at least one temporary file on the auxiliary server are provided in the following:

In the first group of examples, the application server is configured to perform a reassociation between a group file to be split and a corresponding storage object on the temporary file by splitting the group file into two or more sub-group files with corresponding sub-group identifiers. The sub-group files may each be associated with one group fragment. In this first group of examples, one storage one storage object identifier is linked to said two or more sub-group file identifiers. As such, the entries in the temporary storage object can be associated to their respective sub-group, for example, by a sub-group identifier being part of the entry in the temporary storage object. Furthermore, in these first group of examples, transactions can such be linked to the storage object with respective sub-group identifiers.

In the second group of examples, the group file is split into two or more sub-group files with corresponding sub-group identifiers, and also the storage object is split into two sub-storage objects with corresponding sub-storage object identifiers. Typically, the group file and the storage object are split into as many parts as the group is split by the external group split command. In these examples, the application server is to keep a one-to-one relationship between the new sub-group file identifiers and the new sub-storage objects identifiers. As such it is secured that upon accessing a particular sub-storage object only data relating to the sub-group at question can be used. Still, also in this alternative, the first value entries stored in the storage object might be equipped with said sub-group file and/or sub-group identifier so that a certain first value stored in the storage object can be linked to the correct group file and thereby to the correct transaction.

In some examples, a record for each partial transaction of the first transaction comprising the value covered by the partial transaction and the date of the partial transaction is stored in the group file on the application server.

As mentioned above, there may be a plurality of first transactions, these first transactions together may be considered as partial first transaction of a complete first transaction consisting of a plurality of partial first transactions. The partial first transactions may store partial values of the first value which taken together yield the first value of the complete first transaction.

Each partial first value received by such a partial transaction may be stored in the storage object along with a time stamp indicating when each partial transaction was received by the storage object on the auxiliary server. As also mentioned above, these time stamps may be of use for consistency checks. These time stamps may further be used to check whether e.g. payment time limits have been reached or time limits for sending an authentication etc. have been reached.

In some examples, the application server is to check whether the first amount has been transferred to the temporary file before issuing the designated files for each entity of the group transaction. This check may be performed in the context of group bookings, where a certain deposit amount has to be paid before tickets can be issue, as well as in security related applications, where a certain codeword or at least one authentication factor has to be received and checked before certificates or files permitting access, e.g. to a network can be issued.

In some examples, as mentioned before, the group transaction is a group booking transaction with passengers as entities comprised by the group. In these examples, the first transaction is a deposit transaction, the second transaction is a balancing transaction, and the target value is a full amount to be satisfied by a group booking. The temporary file is a temporary account for the deposit value. A voucher is an example for such a temporary account. As such the storage object on the temporary file is a voucher object. Put differently, the temporary account for the deposit value includes a voucher object to hold the deposit value.

In some examples, the identification information for each entity comprised by the group are passenger name records for the group booking and the designated files for each entity of the group transactions tickets issued for these passenger name records. In these examples, the tickets may be tickets for a flight for passengers of a group, each ticket being associated with a particular passenger name record.

In some examples, the application server is a group booking application server, which is to receive separate partial deposit payments as first transactions by passengers associated with the group booking to cover the deposit amount step by step.

In these examples, the auxiliary server is an electronic banking server, wherein the booking application server is to call the electronic banking to update the total amount on the voucher object after each partial deposit payment has been received.

According to a second aspect, a method of processing a group transaction is provided. The group comprises a plurality of entities, wherein the group transaction comprises at least one first transaction and at least one second transaction and wherein the group transaction requires a target value to be received. The method of processing a group transaction comprises receiving the at least one first transaction including a first value and interfacing with an auxiliary server to create and access a temporary file to store the first value, wherein the temporary file is associated with the group transaction. The method further comprises receiving at least one second transaction including a second value after the first transaction has been received; the second value of the at least one second transaction being a value to reach a target value when combined with the first value of the at least one first transaction; receiving identification information for each entity comprised by the group, independently from the first transaction and second transaction, the identification information being associated with the group transaction; and in response to receiving the first value and the second value as well as the identification information for each entity comprised by the group, creating and issuing designated files for each entity of the group transaction.

According to a third aspect, a computer program product comprising program code instructions stored on a computer readable medium to execute the method steps according to the second aspect, when said program is executed on a computer, is provided.

BRIEF DESCRIPTION OF THE DRAWINGS

Examples of the invention are now described, also with reference to the accompanying drawings.

The drawings and the description of the drawings are of examples of the invention and are not of the invention itself. Like reference signs refer to like elements throughout the following description of examples.

DETAILED DESCRIPTION

Figure 1:
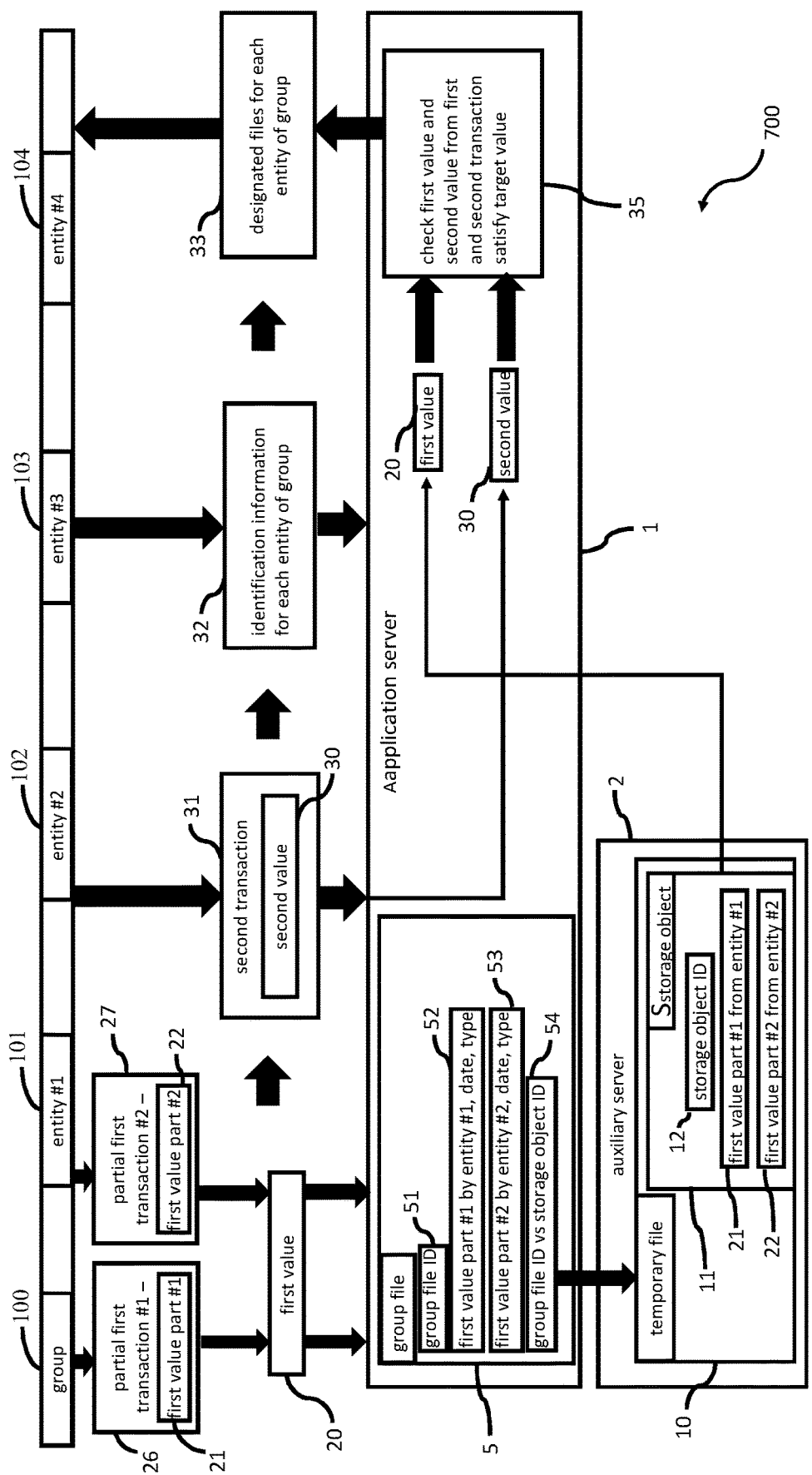
FIG. 1 shows a block diagram of an example of an arrangement of a distributed computer system processing first and second transactions, storing values from the first transaction on a storage object located on the auxiliary server and storing information about the transactions on a group file on the application server.

An example of a distributed computer system 700 for processing a group transaction for a group of a plurality of entities is illustrated by the block diagram shown in FIG. 1.

A group 100 of four entities 101-104 or an entity 101-104 of the group 100 issues a first transaction #1 26 with a first value part #1 21. Thereafter, for example, minutes, hours or days/weeks later, the group 100 or entity 101-104 of the group 100 issues another transaction, namely first transaction #2 27 with a second value part #2 22. Taken together, the two first transactions #1 and #2 26, 27 cover a first value 20.

The first transactions #1 and #2, including said first value 20 are received by an application server 1. The application server 1 identifies the transactions as a first transactions 26, 27, for example, based on a transaction type ID. The application server 1 forwards the first transactions 26, 27 to an auxiliary server 2, on which a temporary file 10 including a storage object 11 resides. This temporary file 10 is either created upon receipt of said first transaction #1 26, or a pre-existing temporary file 10 is used. The storage object 11 on the temporary file 10 has a storage object ID 12 assigned to it. The storage object 11 further stores information 21 about the amount of the first value part #1 together with information 21 about the entity of the group to which the first value part #1 is assigned. Corresponding information 22 about the amount of the first value part #2 is stored in the storage object 11, as well. The first value amount on the storage object 11 can be updated any time, when, for example, a third partial first transaction with a first value part #3 etc. is received.

On the application server 1m a group file 5 is created and stored. The group file 5 has the purpose of storing further information about the first value transaction(s) and to store an association between the group file and a storage object (there is e.g. a group file 5 for each storage object). A further purpose of the group file 5 is to store information regarding payment limits, time limits etc.

In the example illustrated by FIG. 1, the group file 5 stores a group file ID 51 as well as information 52 about the amount of the first value part #1 and the entity to which the first value part #1 is associated and the date of the partial first transaction #1, as well as the type of transaction. Corresponding information 53 regarding the first value part #2 is stored on the group file 5 as well. Furthermore, the group file 5 stores an association 54 between the group file ID 51 and the storage object ID 12 of the storage object 11 on which the first value 20 (made up, in this example, by first value part #1 21 and first value part #2 22) is stored.

Sometime after the first transactions #1 and #2 26, 27 a second transaction 31 including a second value 30 is issued by the group 100 or an entity 101-104 encompassed by the group to the application server 1. The second transaction 31 includes a second value 30 which is a value to reach a target value when combined with the first value 20.

After the second transaction, group 100 or one of the group entities 101-104 sends identification information for each entity 101-104 of the group 100 to the application server 1.

It is further checked 35, on the application server 1, whether the first value 20 and the second value 30 (from the first and second transactions 26, 27, 31) satisfy the target value. If this is the case, and the identification information from each group entity 32 has already been received, designated files for each entity of the group 33 are issued to the group 100.

Two different examples for an approach to handle a group split command 57 in the course of the group transaction processing are shown in FIG. 2.

Figure 2A:
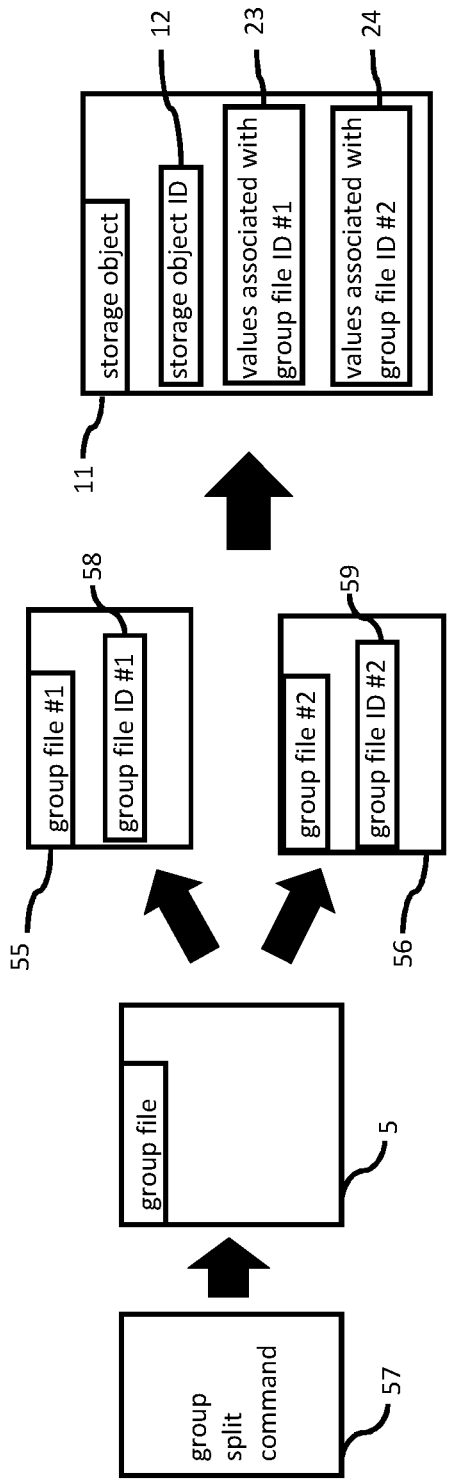
FIG. 2A shows a block diagram of an example of a process of splitting a group file into two sub-group files, which are associated with a single storage object.

According to the first example illustrated by FIG. 2A, a group file 5 is split into a group file #1 55 and a group file #2 56. The group file #1 55 has a group file ID #1 58, whereas the group file #2 has a group file ID #2 59. The two group files (group file #1 55 and group file #2 56) are mapped to a single storage object 11. The mapping is, for example, performed by the application server 1 (see FIG. 1). The storage object has a storage ID 12. The same storage object 11 holds values associated with the group file ID #1 23 as well as values associated with group file ID #2 24. A single storage ID 12 is kept linked to two or more or more group file IDs. Transactions and corresponding values received by the storage object are then linked to the respective group file ID to keep an association there.

Summarized, in the example illustrated by FIG. 2A, the group file 5 is split into two or more sub-group files (here group file #1 55, group file #2 56) with corresponding sub-group identifiers (here group file ID #1 58, group file ID #2 59), with one storage object identifier (here storage object ID 12) being linked to said two or more sub-group file identifiers (here group file ID #1 58, group file ID #2 59). Transactions are linked to one of the storage objects with respective sub-group identifiers.

Figure 2B:
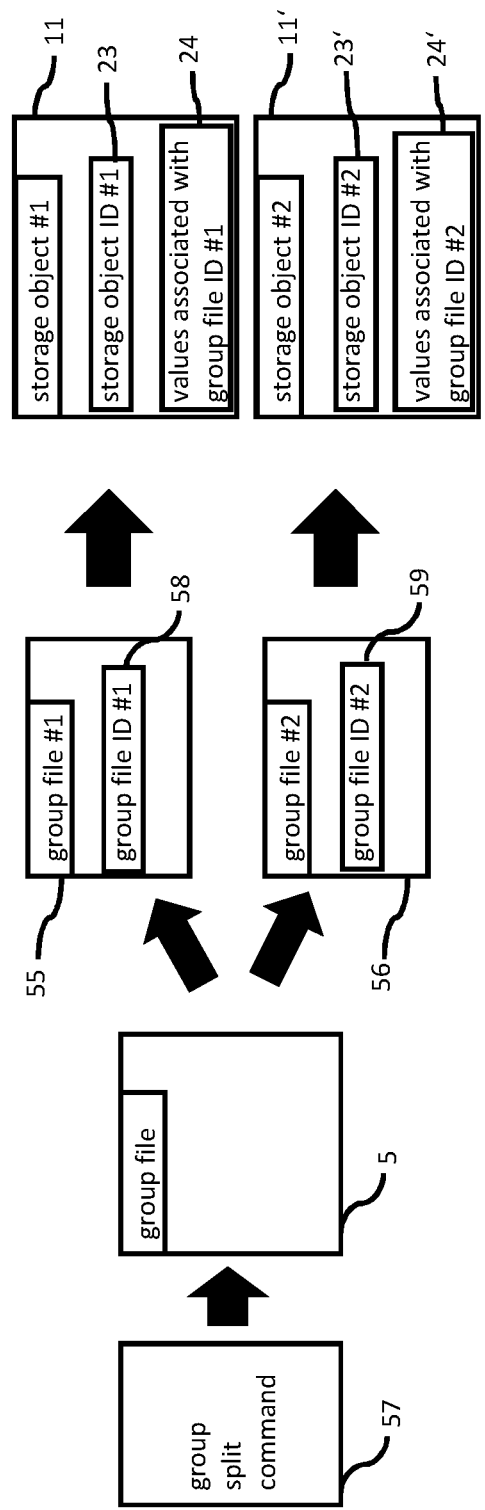
FIG. 2B shows a block diagram of an example of a process of splitting a group file into two sub-group files, with each sub-group file being associated with a respective sub-storage object.

According to the second example illustrated by FIG. 2B, also the group file 5 is split into a group file #1 55 and a group file #2 56 with respective group file identifiers 58, 59, as shown in FIG. 2A. However, unlike in FIG. 2A, the storage object 11 is also split into a storage object #1 11 with a storage object ID #1 23 and a storage object 11' with a storage object ID #2 23'. The storage object #1 11 stores values associated with the group file ID #1 24 and the storage object #2 11' stores values associated with group file ID #2 24'. The corresponding storage object ID #1 23 and storage object ID #2 23' and group file ID #1 58 and group file ID #2 59 enable the application server 1 (see FIG. 1) to keep an on-to-one relationship between the group file ID and the storage object ID (data from storage object ID #1 23 is mapped to group file ID #1 58, data from storage object ID #2 23' is mapped to group file ID #2 59 and vice versa).

Summarized, in the example illustrated by FIG. 2B, a reassociation between a group file 5 to be split and a corresponding storage object 11 on the temporary file 10 (see FIG. 1) is achieved by splitting the group file 5 into two or more sub-group files (here group file #1 55 and group file #2 56) with corresponding sub-group identifiers (here group file ID #1 58, group file ID #2 59), and splitting also the storage object 11 into two sub-storage objects (here storage object 11, storage object 11') with corresponding sub-storage object identifiers (here storage object ID #1 23, storage object ID #2 23'). The application server 1 is to keep a one-to-one relationship between the new sub-group file identifiers and the new sub-storage objects identifiers.

Figure 3:
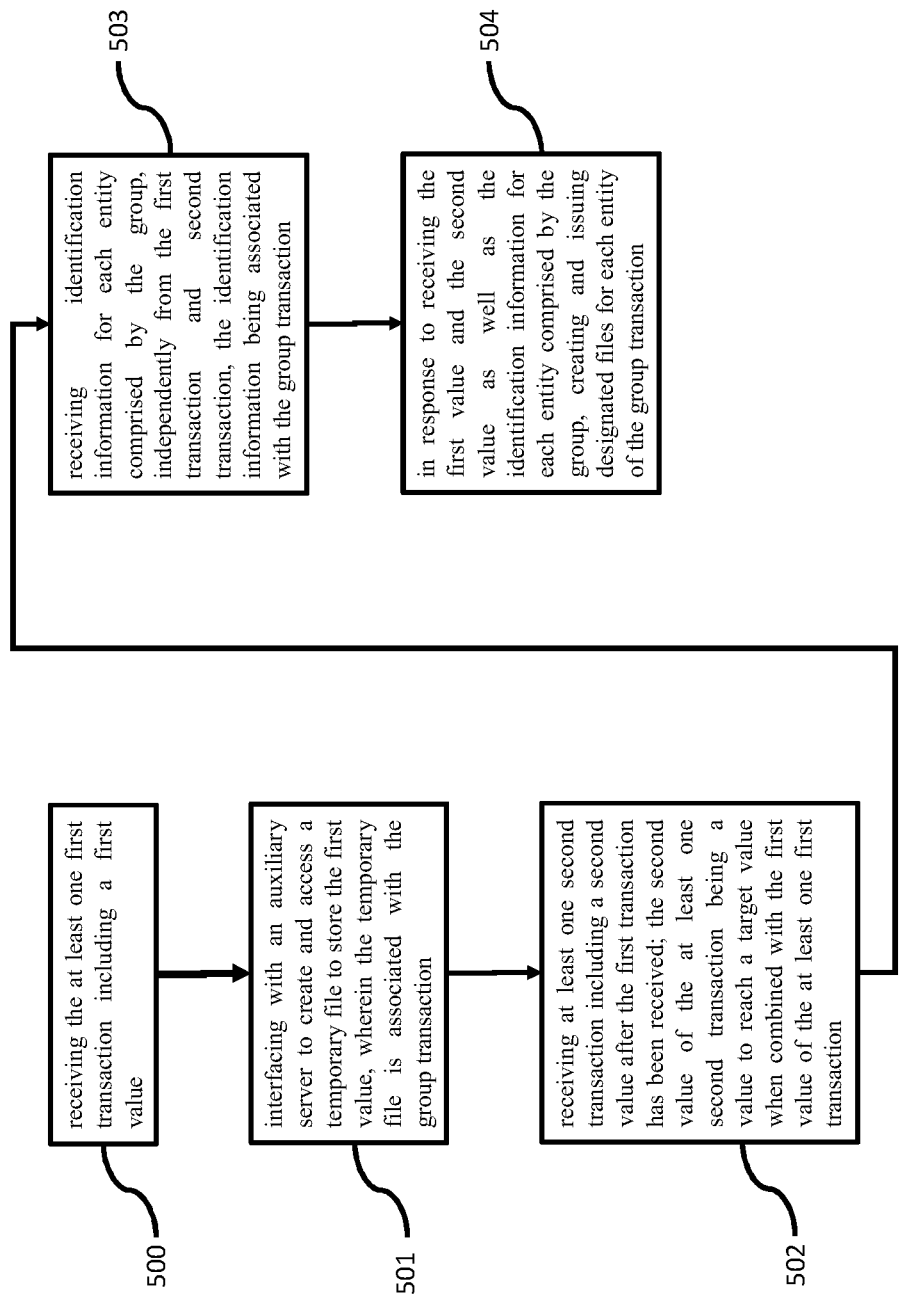
FIG. 3 shows a flow chart of an example of a method of processing a group transaction involving said first and second transactions with said first and second values.

A schematic flowchart for the method of processing a group transaction for a group of a plurality of entities is illustrated by FIG. 3.

In an activity 500, for example, an application server 1 (see FIGS. 1 and 2) receives the at least one first transaction including a first value, in an activity 501 e.g. the application server 1, interfaces with an auxiliary server to create and access a temporary file to store the first value, wherein the temporary file is associated with the group transaction.

In an activity 502, e.g. the application server 1, receives at least one second transaction including a second value after the first transaction has been received. The second value of the at least one second transaction is a value to reach a target value when combined with the first value of the at least one first transaction.

In an activity 503, e.g. the application server 1, receives identification information for each entity comprised by the group, independently from the first transaction and the second transaction, the identification information being associated with the group transaction.

In an activity 504, e.g. the application server 1, in response to receiving the first value and the second value as well as the identification information for each entity comprised by the group, creates and issues designated files for each entity of the group transaction.

Although the teaching of the present application will be described in the following on the example of a processing of a group travel booking transaction, several other examples of applying the teaching of the present application are conceivable.

As mentioned above, the first and second transactions could be related to mobile network security related requests, for example, a two-factor authentication. In an example for a two-factor authentication working according to this principle, a first codeword from a first group entity could be received. Later a second codeword could be received which has to match a criterion (target value) together with the first codeword which was stored on the temporary storage on the auxiliary server. After matching codewords are received, the identity information regarding the entities of the group are received. In response to said codewords matching the target value (e.g. a hash value to be calculated based on both codewords) the designated files could be issued to each entity of the group, wherein the designated information could be matched with the identity information. Those designated files could relate to individual authentication documents for reviewing protected content etc.

Figure 4:
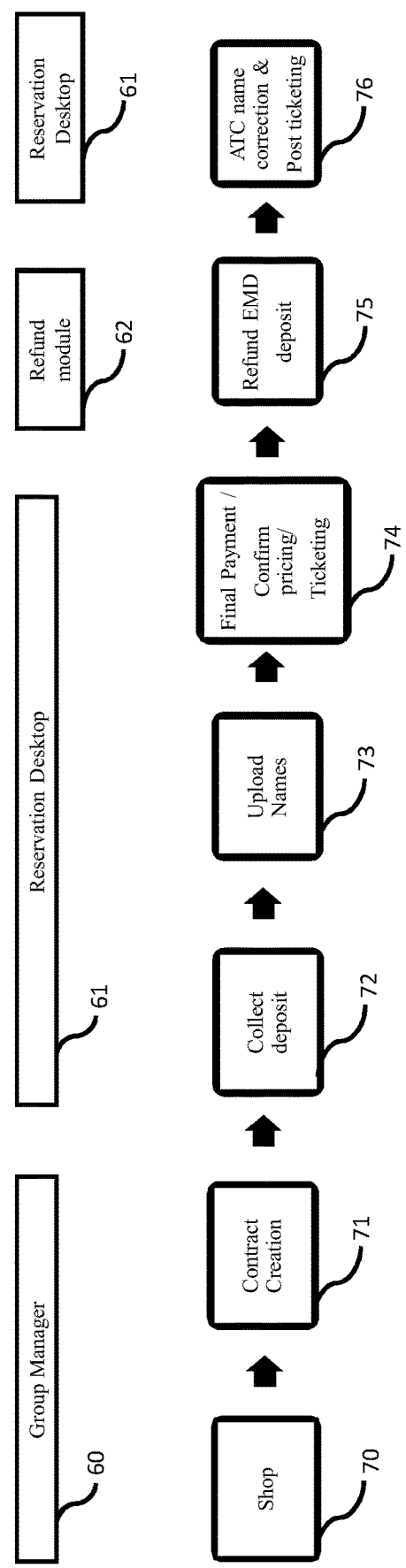
FIG. 4 shows an example of a group booking process including a refund of a deposit payment according to the state of the art.

Returning now to the figures, FIG. 4 represents a group booking processing representing a conventional approach according to prior art. In this approach, a group manager 60 involves a (ticket)shop 70 and a contact creation 71, in the course of which a passenger name record is created and a price for an itinerary is calculated. The processes performed in the group manager 60 in this step might further involve status management, renegotiation etc. Then, an agent goes to a Reservation Desktop in order to collect a group deposit 72. To collect the group deposit 72, an EMD (Electronic Miscellaneous Document) is issued against one passenger name. A deposit of e.g. $50 is collected per passenger of the group, this deposit payments are consumed at issuance. Thereafter, the names of the passengers for which the group booking is performed are uploaded 73. All names of all passengers in the group are required in order to collect the complete payment (=full ticket price payment) and to issue the tickets.

In quite some cases, the names of the passengers that eventually will travel are unknown. Therefore, in these cases fake names are added in case names are unknown before ticket time limit.

Subsequently, the full payment, the confirmation of pricing and ticketing 74 takes place. Here, all tickets for all passengers are issued to charge the group with the full amount. This is one payment with only one form of payment (e.g. Credit Card, Invoice). After the full (balancing) payment a refund operation 75 regarding the deposit takes place on the basis of the EMD used to collect the group deposit. This refund function might be implemented by a Refund module 62 on e.g. the airlines side for which the tickets are booked, which makes the process a back-office process. Finally, again on the Reservation Desktop 61, a name correction on the tickets (still carrying fake names to ensure feasibility of the group booking) is performed as well as post ticketing 76. An example for post ticketing operation is, for example, the refund of excess money paid.

Figure 5:
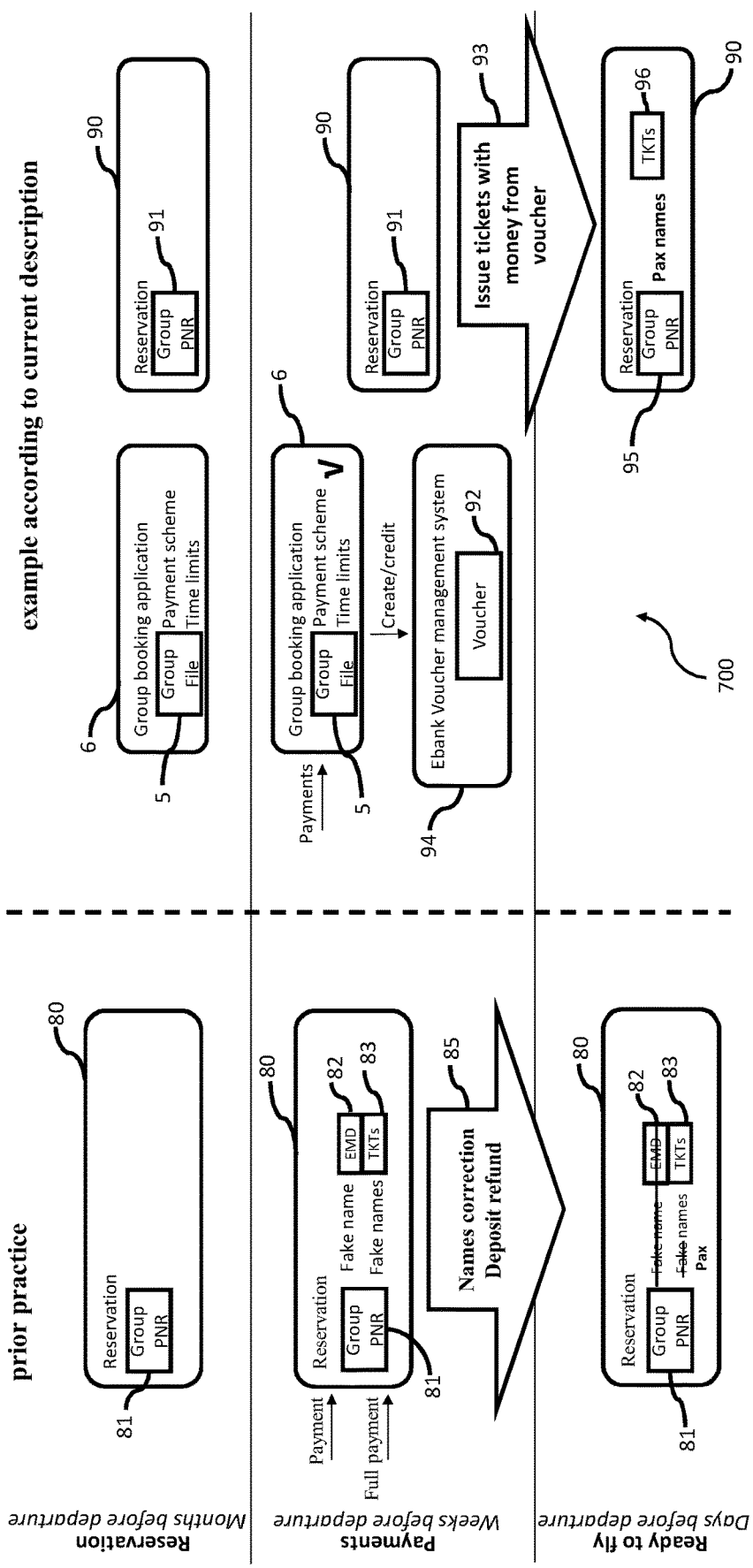
FIG. 5 shows a schematic comparison of a group booking processing according to the state of the art as shown in FIG. 4 and a group booking processing according to the present disclosure as shown in FIGS. 6 to 9.

An example according to the current description is further explained in conjunction with FIG. 5, which shows a comparison between the prior practice, also described in conjunction with FIG. 4, on the left-hand side and an example for appliance of the method of group transaction processing in flight booking on the right-hand side of FIG. 5.

According to the prior practice (illustrated on the left-hand side of FIG. 5), a reservation 80 requires a group PNR (passenger name record) 81. Using this group PNR 81 a payment of a deposit is received. The payment is captured via a EMD 82. The foundation for the group reservation is typically laid months before the planned departure. Exchanging an EMD 82 for a ticket can be complex, since, for example, the usage of an EMD 82 may require to enter at least name for the deposit payment to be accepted. Since likely not the names of all the travellers are known at the time of booking, fakes names have to be entered to the EMD 82 to satisfy this requirement.

A full payment scheme is likely used according to which a deposit payment is followed by at least one incremental payment up to the full payment covering the total amount, e.g. the full price for the group booking of a flight. In some systems, a single different EMD 82 might be required for each incremental payment. The ticket issuer (e.g. an airline) requires typically that the total amount is satisfied before the tickets for all the passengers of the group are issued. This is likely required before all passenger names are known, leading again to use fake names on the electronic tickets 83. This process takes place, typically weeks before the departure.

These fakes names have to be replaced as soon as the names of passengers for which the tickets should be issued are finally known. Further, since the incremental payment(s) that followed the deposit payment covers the total amount, the deposit payment has to be refunded (otherwise the group would have paid a higher amount than the total amount that is due). Summarized, a name correction and deposit refund process 85 has to be performed. When the tickets are finally issued (days before departure), the fake names have to be replaced by the real names on the tickets before they are issued.

According to an example according to the current description (illustrated by the right-hand side of FIG. 5) a group booking application 6 holding a group file 5 is used. The group file 5 includes the payment scheme (e.g. deposit payment+at least one balancing payment) and the time limits for the payments/issuing the tickets and so forth. The reservation 90 is a parallel process that also uses a group passenger name record 91.

The (deposit) payments are received via a group booking application and their date and value may be recorded in the group file 5. The group file 5 further stores the time limits and the payment schemes, so that the payments (transactions) received can be checked relative these time limits and payment schemes. By the group booking application 6, typically residing on a group booking server 1 (see FIG. 1), a voucher object 92 is created, the voucher object may correspond to a storage object 11 (see FIG. 1). The voucher object 92 is created and used on an Ebank voucher management system 94 which may be operated on an auxiliary server 2 (see FIG. 1).

The voucher object 92 is used to store the deposit amount. Then, the same voucher object 92 is used and credited after each payment until the final payment is due. The money credited can then be used to pay and issue tickets 96. With the voucher object 92, multiple payments can be done at any time before the time limits defined by e.g. the airline (usually a time limit is set to collect the deposit and another one for the balance). The distributed computer system 700 accepts unlimited payments/top-ups with a wide range of forms of payment and combination. Due to the use of the voucher object 92 group reservation may be performed in which each passenger or sub-group of passengers (e.g. family) included in the group is able to do their own payment. With the voucher object 92, which is used as a source of payment together with the balancing transaction, the group deposit amount initially collected does not need to be refunded. Summarized, an issue tickets with money from voucher process 93 has to be performed.

The use of the voucher object 92 allows to store payments allowing the ticket issuer, e.g. the airline, to charge the customers without having already the real passenger names in the group PNR 95. Since a group leader may not have all the names when the final payment is due, it allows the ticket issuer, e.g. the airline, to collect the money anyway (blocking seats in the inventory). The ticket issuer, e.g. the airline, can issue the tickets 96 until three days prior to departure (a point in time where the real names are most probably known.

To put it in more general terms, the voucher object 92 allows to separate the payment related steps of a group booking from the actual ticketing. This is the case, since the tickets 96 are issued with the money from the voucher object 92 and the names can be added independent from the payment. There is no need to have the name of at least one passenger of the group in order to being able to receive the deposit payment using a EMD 98 (see prior practice).

Examples for an implementation of the distributed computer system 700 according to the right-hand side of FIG. 5 are shown in the FIGS. 6 to 9.

Figure 6:
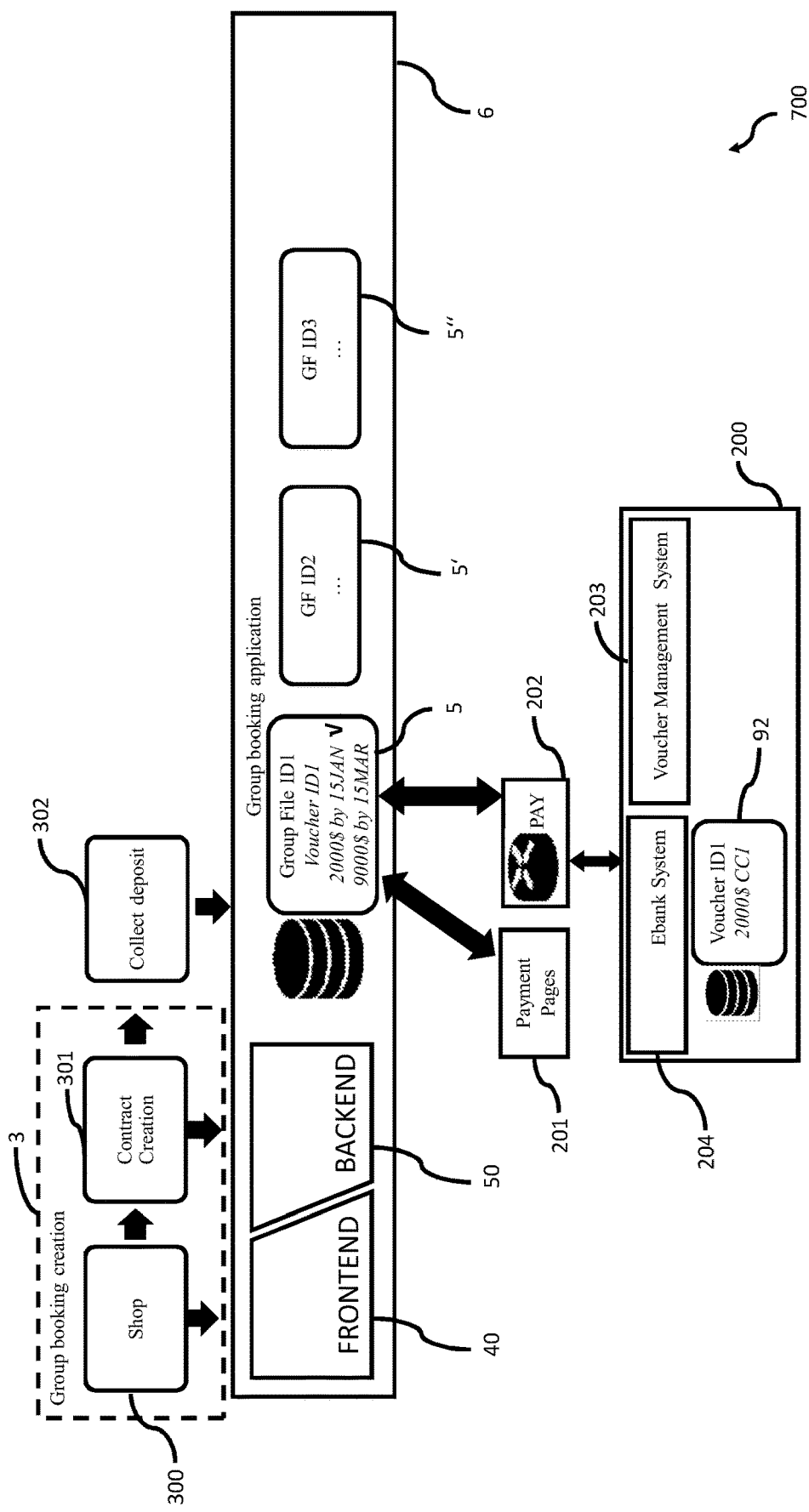
FIG. 6 shows a schematic block diagram of an example of a group booking arrangement involving an application server for receiving a deposit transaction and an auxiliary server storing a voucher object to hold the deposit transaction, the block diagram illustrating the processing of the creation of a group booking and deposit collection.

The example block diagram of FIG. 6 illustrates the processing of a group booking process from a shop activity 300 to a collect deposit activity 302. The group booking creation 3 involves visiting a (ticket) shop 300 which calls a frontend 40 of the group booking application 6. In response to this call, a contact creation 301 involving the backend 50 of said group booking application 6 is initiated. The next activity performed is a deposit collection 302, which is, in this example, the process of collecting deposit payments. To process the deposit collection 302, the group booking application 6, hosted by a group booking application server 1 (see FIG. 1), interfaces with an external Ebank system server system 200, which may be implemented on an auxiliary server 2 as shown in FIG. 1. Accessing the Ebank server system 200 may involve calling payment pages 201 over a payment application 202. The payment pages 201 may handle multiple forms of payment per transaction, handle other forms of payments than credit card (e.g. invoice or cash), collect email & billing address, and send data to group booking application for voucher object creation/update.

Hence, the distributed computer system may integrate the payment pages 201 with the system and may interface with said payment application 202 in order to create a voucher object 92 on an Ebank server system 200. For the purpose of creating the voucher object 92, the payment application 202, in turn, may interface the Ebank server system 200. However, the group booking application 6 may also interface the Ebank server system directly. The payment application 202 may also be involved in booking orchestration tasks.

When having interfaced with the Ebank server system 200, the Ebank system 204 in association with an external voucher management system 203 creates a voucher object 92. The voucher object 92 has a particular voucher ID (here: voucher ID1). The voucher object 92 on the Ebank server system 200 may also be created by the payment application 202 and only be stored as a voucher object on the Ebank server system 200. The voucher object 92 may be managed by said external financial service provider 203. The payment application 202 may in this way interface with the Ebank server system 200 and collect the deposit or retrieve money from the voucher object 92.

A deposit payment of $2000 is stored on the voucher object 92. The deposit payment of $2000 is an example for a first value as described in conjunction with FIG. 1. In the voucher object, not only the amount of the deposit payment, but also the corresponding form of payment may be stored along with the amount. In the example illustrated by FIG. 6, the deposit amount of $2000 was paid by a first credit card (indicated by CC1 in the figure).

In general, the Ebank system 204 is the voucher management system that stores the voucher object 92. Once a reservation is made and the customer wants to make a payment, the system may be calling the Ebank system 204 to create a voucher object 92. This voucher object 92 is associated to the group reservation. No passenger name but only a group name is needed to create the reservation.

The group booking application 6 stores a group file 5 with a particular group file identifier. One entry of the group file 5 illustrated by FIG. 6 is the voucher ID of the voucher object 92 which holds the deposit amount of $2000. The other entries correspond to protocol of payments which have already been received and which are still to be received. As such, there is an entry for the $2000 along with the payment date of January 15$^{th}$ deposit payment which already has been received (that the payment already has been received is indicated by the check sign (✓) on the right-hand side of the payment target and an entry indicating a total amount of $9000 to be paid by March 15$^{th}$.

Thanks to the association between the group booking and the voucher ID that is stored in the group file 5 on the group booking application 6 side, the system can make multiple payments and call the Ebank system 204 for each new payment in order to update the voucher amount. For each payment, the forms of payment used, and the corresponding amounts are sent to the Ebank system 204. Then, the Ebank system 204 can either charge the customer at time of payment or once the balance is fully paid.

It is further indicated in FIG. 6 by further group files 5', 5" with different group file identifiers, that the group booking application 6 has the ability to deal with several group files 5, 5', 5" successively or at the same time.

Figure 7:
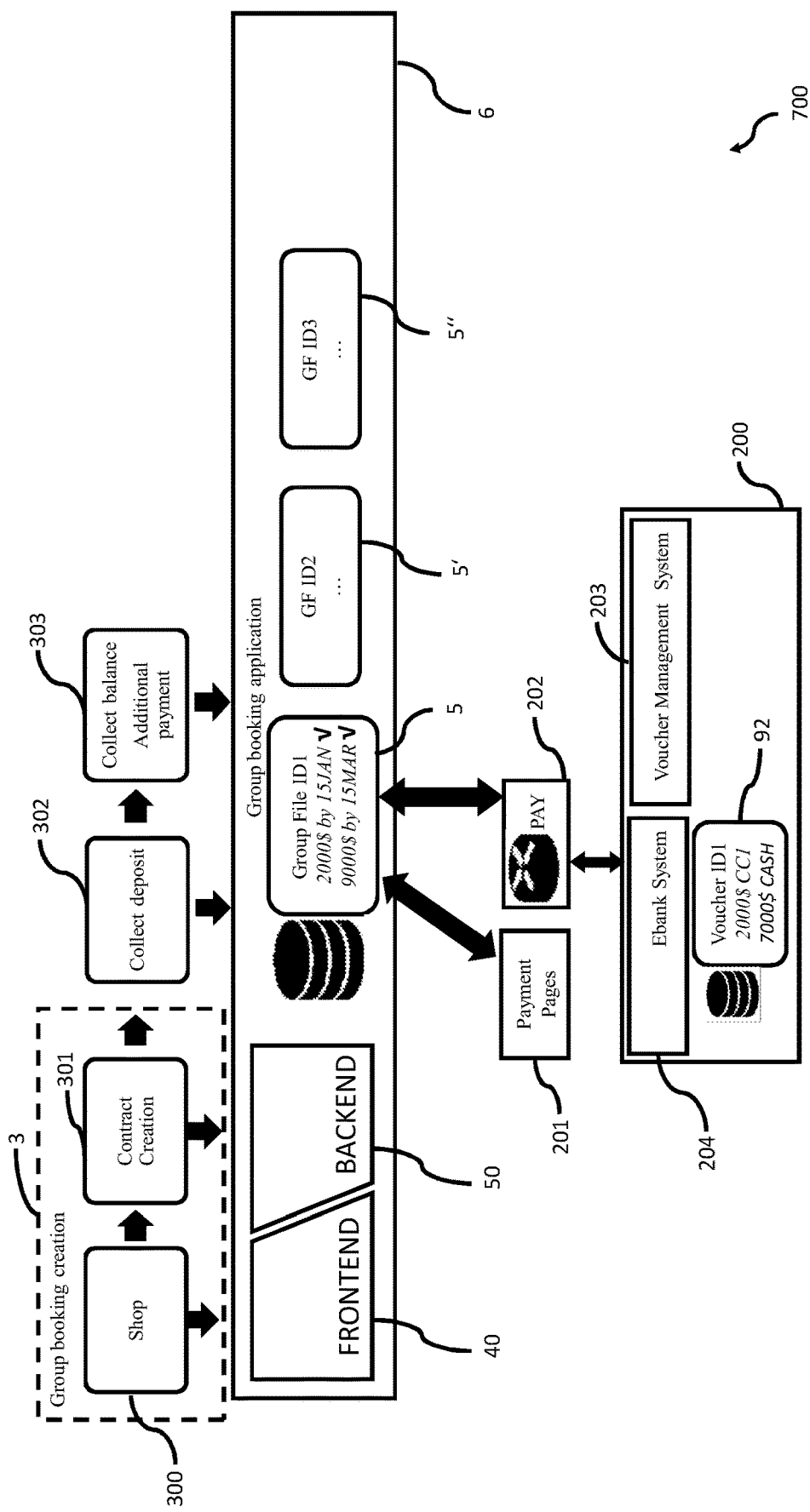
FIG. 7 shows the block diagram of FIG. 6 further involving balance collection and updating of the group file and the voucher object.

The distributed computer system of FIG. 6, when dealing with a balance collection (additional payment) activity 303 is illustrated by the schematic block diagram of FIG. 7.

After the deposit collection activity 303, the balance is collected, which corresponds to performing an additional payment. This balancing transaction 303, corresponding to an example for a second transaction in FIG. 1, is received by the group booking application 6. Via the above-mentioned payment application 202 (typically involving payment pages 201) the group booking application transfers the balance also to the voucher object. In the example illustrated by FIG. 7, the balancing payment 303 corresponds to a payment of $7000 with the form of payment cash. This is indicated by an entry of the voucher object 92. The respective payment target of a total amount of $9000 is marked as being fulfilled in the group file 5, as indicated by the check sign (✓) on the right-hand side of the payment target of the group file 5 in FIG. 7.

Figure 8:
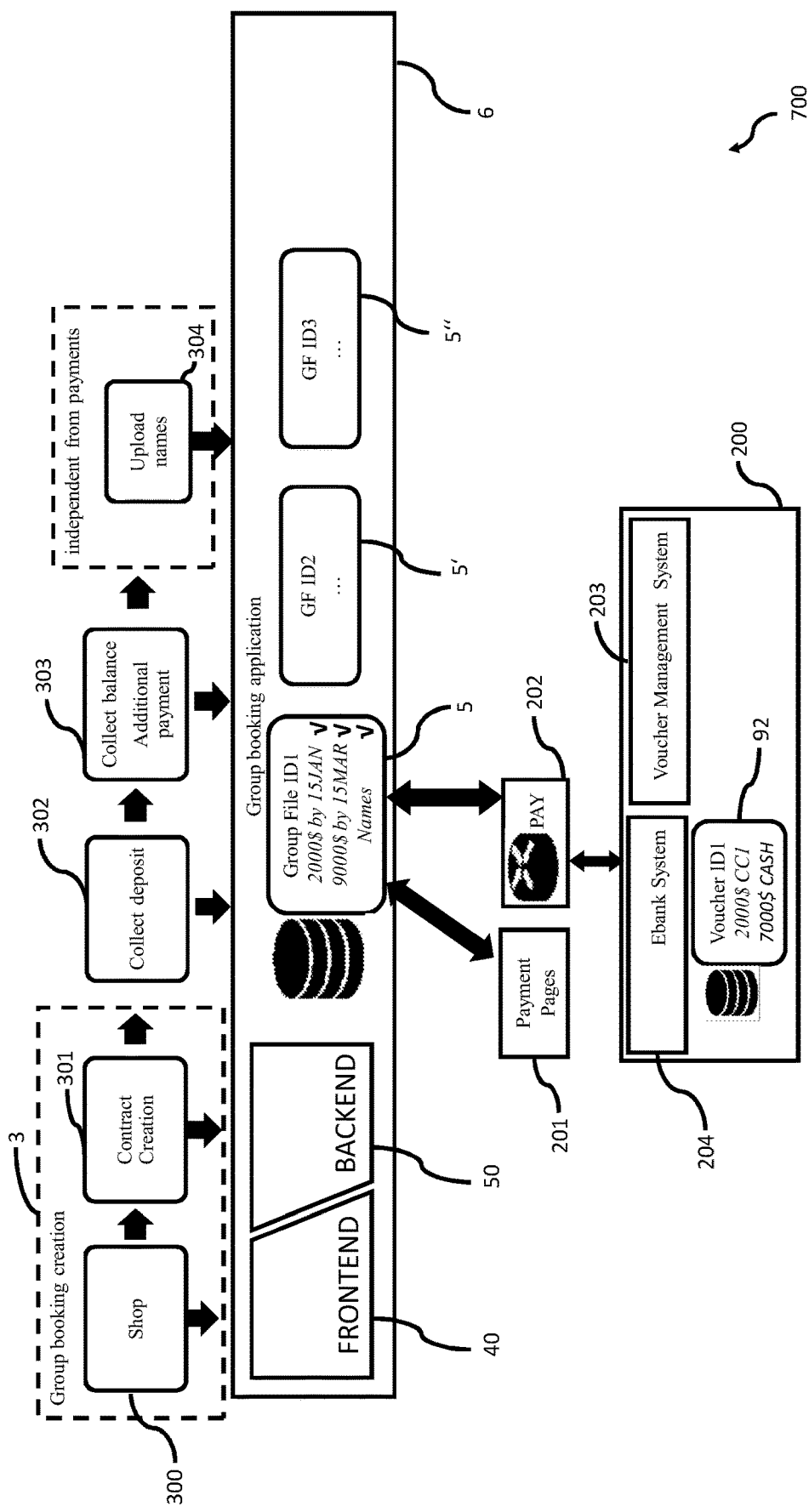
FIG. 8 shows the block diagram of FIG. 7 further involving the upload of names for passenger records and updating the group file and voucher object.

The processing of identification information for group entities by the distributed computer system of FIGS. 6 and 7 is illustrated by FIG. 8.

In an upload names activity 304, identification information each group entity is received by the group booking application 6, as the names of passengers of the group is uploaded. The process of uploading the passenger names is independent from the payments made to collect the deposit 302 or to collect the balance 303. There is no requirement anymore that at least one passenger name should be available before a (deposit)payment is accepted by the group booking application 6. The upload names activity 304 may also involve adding/editing or deleting names in passenger name records that already have been received. In the group file it is marked that the target of receiving names has been fulfilled, see the check sign (✓) on the right-hand side of the names target of the group file 5 in FIG. 8. Once the passenger names have been received in activity 304, the group booking process can commence to the issuing of tickets 96 to those passengers identified by their passenger names.

Figure 9:
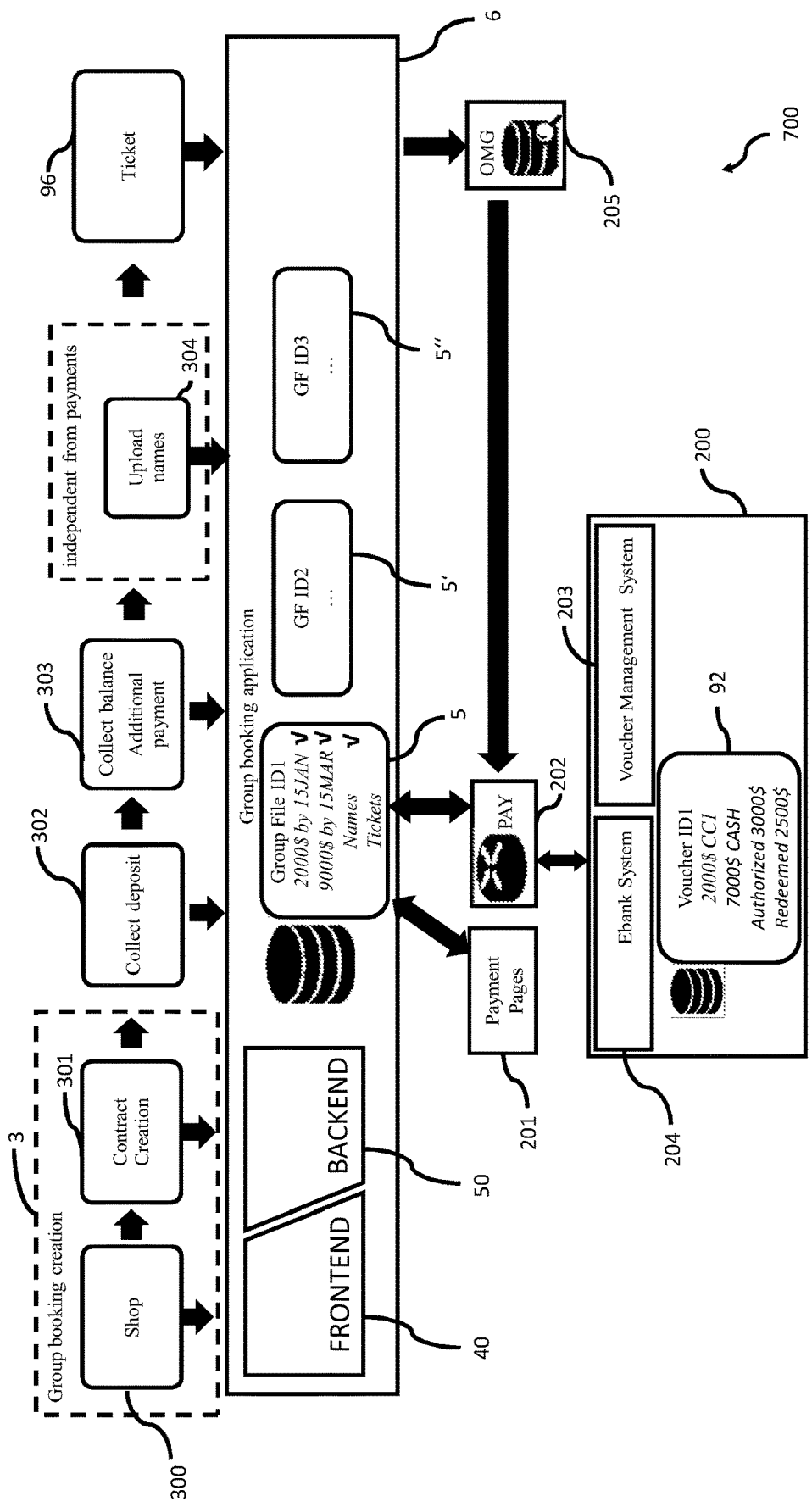
FIG. 9 shows the block diagram of FIG. 8 further involving the issuing of tickets for passengers of the group as well as updating the group file and the voucher object.

As illustrated by FIG. 9, the group booking application 6 issues the tickets 96 for the passengers included in the group booking.

In the final payment step before the tickets 96 are issued, the voucher object 92 with the voucher ID associated with the group booking/group file is selected as form of payment to the passenger name records of the tickets. The payment for the tickets 96 is hence, carried out by the money stored on the voucher object 92 behind the scene. The itinerary for the tickets is requested when orchestrating the ticket issuance, as well.

As mentioned above, ticketing is decoupled from payment which allows to dispense with fake names and adds flexibility regarding price adjustments and adjustments for the forms of payment.

An OMG database 205 may be called to initiate the payment process. Along with the requested itineraries also the original forms of payment (the forms of payment originally selected by the passengers) may be sent.

The voucher object 92 may be used to refund excess money paid using the group booking application 6. For the refund in such cases, a breakdown of payments (including the amount of a payment and the form of payment already stored in the voucher object 92 may be used. This payment information may be retrieved using the voucher object ID stored in the ticket 96 to be refunded. The association between the form of payment and the amount of payment performed by a passenger may also be stored to refund the ticket 96 directly on the form of payment used by a given passenger. The refund may take place through the group booking application 6.

As mentioned above, the sequence of activities to perform a group booking shown in FIGS. 6 to 9 conserves computational resources, since, compared to the prior practice approach illustrated on the left-hand side of FIG. 5, neither a correction of previously entered fake names is required, nor a refund step for the previously received deposit payments is required.

Although certain products and methods constructed in accordance with the teachings of the invention have been described herein, the scope of coverage of this invention is not limited thereto. On the contrary, this patent covers all embodiments of the teachings of the invention fairly falling within the scope either literally or under the doctrine of equivalents.

What is claimed is:

1. A distributed computer system for processing a group transaction, the distributed computer system comprising an application server that includes:
   a non-transitory computer-readable storage medium; and
   one or more processors coupled to the non-transitory computer-readable storage medium, wherein the non-transitory computer-readable storage medium comprises program instructions that, when executed on the one or more processors, cause the one or more processors to perform operations comprising:
      receiving at least one first transaction from a first device including a first value, wherein the group transaction is a group booking transaction with passengers as entities comprised by a group, the at least one first transaction is a deposit transaction;
      interfacing with an auxiliary server to create and access a temporary file to store the first value, wherein the temporary file is associated with a deposit value for the group transaction, and wherein the auxiliary server is an electronic banking server;
      receiving at least one second transaction from a second device including a second value after the at least one first transaction has been received, wherein the second value of the at least one second transaction is a value to reach a target value when combined with the first value of the at least one first transaction, and wherein the at least one second transaction is a balancing transaction, and the target value is a full amount to be satisfied by the group booking;
      performing a two-factor authentication process for each device associated with each entity of the group, wherein each entity of the plurality of entities is associated with a corresponding device, and wherein the two-factor authentication process includes:
         receiving a first codeword from a first group entity, storing the first codeword on a temporary storage on the auxiliary server,
         receiving a second codeword from the first group entity, and
         performing the two-factor authentication for each device associated with the first group entity based on matching the first codeword and the second codeword to a calculated hash value based on the first codeword and the second codeword;

after the matching the first codeword and the second codeword, receiving identification information for each entity of plurality of entities of the group independently from the at least one first transaction and second transaction, wherein the identification information is associated with the group transaction;

generating designated files for each device for each entity of the group transaction;

receiving separate partial deposit payments as first transactions by the passengers associated with the group booking to cover a deposit amount; and in response to receiving separate partial deposit payments as first transactions:

instructing the auxiliary server to update a total amount on a voucher object after each partial deposit payment has been received, wherein, in response to receiving a request to split the group, a group file on the application server and the temporary file on the auxiliary server are adapted to an intended split, and determining a reassociation between the group file to be split and a corresponding storage object on the temporary file by splitting the group file into two or more sub-group files with corresponding sub-group file identifiers, and splitting also the storage object into two sub-storage objects with corresponding sub-storage object identifiers, wherein each storage object is stored in a corresponding temporary file, and wherein the application server is configured to keep a one-to-one relationship between the sub-group file identifiers and the sub-storage object identifiers.

2. The distributed computer system of claim 1, wherein the temporary file stores a history of values received via the partial deposit payments along with a date of the partial deposit payments and a type of transaction performed.

3. The distributed computer system of claim 1, wherein the temporary file contains a dedicated storage object for the first value.

4. The distributed computer system of claim 1, wherein a record for each partial deposit payment comprising the value covered by the partial transaction deposit payment and a date of the partial deposit payment is stored in the group file on the application server.

5. The distributed computer system of claim 1, wherein the application server is configured to check whether the first value has been transferred to the temporary file before issuing the designated files for each entity of the group.

6. The distributed computer system of claim 1, wherein the identification information for each entity comprised by the group are passenger name records for the group booking and the designated files for each entity of group transaction tickets issued for the passenger name records, and wherein the temporary account for the deposit value includes the voucher object to hold the deposit value.

7. The distributed computer system of claim 1, wherein the application server comprises one or more processors configured to perform operations, the operations comprising:

receiving the separate partial deposit payments as the first transactions by the devices associated with the entities of the group to cover the first value; and instructing the auxiliary server to update the first value stored in the temporary file.

8. The distributed computer system of claim 1, wherein the application server comprises one or more processors configured to perform operations, the operations comprising:

receiving the separate partial deposit payments by the passengers associated with the group booking to cover the deposit amount; and calling the electronic banking server to update a total amount on a voucher object after each partial deposit payment has been received.

9. The distributed computer system of claim 1, wherein the application server comprises one or more processors configured to perform operations, the operations comprising:

splitting the group file into the two or more sub-group files with the corresponding sub-group file identifiers; and splitting the storage object into the two sub-storage objects with the corresponding sub-storage object identifiers, wherein the new sub-group file identifiers and the new sub-storage objects identifiers are based on the one-to-one relationship between the sub-group file identifiers and the sub-storage object identifiers.

10. A method of processing a group transaction, the method comprising: at an application server comprising one or more processors:

receiving, by the application server, at least one first transaction from a first device including a first value, wherein the group transaction is a group booking transaction with passengers as entities comprised by a group, the at least one first transaction is a deposit transaction;

interfacing with an auxiliary server to create and access a temporary file to store the first value, wherein the temporary file is associated with a deposit value for the group transaction 1 and wherein the auxiliary server is an electronic banking server;

receiving, by the application server, at least one second transaction from a second device including a second value after the at least one first transaction has been received, wherein the second value of the at least one second transaction is a value to reach a target value when combined with the first value of the at least one first transaction, and wherein the at least one second transaction is a balancing transaction, and the target value is a full amount to be satisfied by the group booking;

performing, by the application server, a two-factor authentication process for each device associated with each entity of the group, wherein each entity of the plurality of entities is associated with a corresponding device, and wherein the two-factor authentication process includes:

receiving a first codeword from a first group entity, storing the first codeword on a temporary storage on the auxiliary server, receiving a second codeword from the first group entity, and performing the two-factor authentication for each device associated with the first group entity based on matching the first codeword and the second codeword to a calculated hash value based on the first codeword and the second codeword;

after the matching the first codeword and the second codeword, receiving, by the application server, identification information for each entity of plurality of entities of the group independently from the at least one first transaction and second transaction, wherein the identification information is associated with the group transaction;

generating designated files for each device for each entity of the group transaction;

receiving separate partial deposit payments as first transactions by the passengers associated with the group booking to cover a deposit amount; and in response to receiving separate partial deposit payments as first transactions:

instructing the auxiliary server to update a total amount on a voucher object after each partial deposit payment has been received, wherein, in response to receiving a request to split the group, a group file on the application server and the temporary file on the auxiliary server are adapted to an intended split, and determining a reassociation between the group file to be split and a corresponding storage object on the temporary file by splitting the group file into two or more sub-group files with corresponding sub-group file identifiers, and splitting also the storage object into two sub-storage objects with corresponding sub-storage object identifiers, wherein each storage object is stored in a corresponding temporary file, and wherein the application server is configured to keep a one-to-one relationship between the sub-group file identifiers and the sub-storage object identifiers.

11. The method of claim 10, wherein the temporary file stores a history of values received via the partial deposit payments along with a date of the partial deposit payments and a type of transaction performed.

12. The method of claim 10, wherein the identification information for each entity comprised by the group are passenger name records for the group booking and the designated files for each entity of group transaction tickets issued for the passenger name records, and wherein the temporary account for the deposit value includes the voucher object to hold the deposit value.

13. The method of claim 10, further comprising: checking, by the application server, whether the first value has been transferred to the temporary file before issuing the designated files for each entity of the group transaction.

14. A non-transitory computer storage medium encoded with a computer program, the computer program comprising a plurality of program instructions that when executed by one or more processors cause the one or more processors on an application server to perform operations comprising:

receiving at least one first transaction from a first device including a first value, wherein the group transaction is a group booking transaction with passengers as entities comprised by a group, the at least one first transaction is a deposit transaction;

interfacing with an auxiliary server to create and access a temporary file to store the first value, wherein the temporary file is associated with a deposit value for the group transaction, and wherein the auxiliary server is an electronic banking server;

receiving at least one second transaction from a second device including a second value after the at least one first transaction has been received, wherein the second value of the at least one second transaction is a value to reach a target value when combined with the first value of the at least one first transaction, and wherein the at least one second transaction is a balancing transaction, and the target value is a full amount to be satisfied by the group booking;

performing a two-factor authentication process for each device associated with each entity of the group, wherein each entity of the plurality of entities is associated with a corresponding device, and wherein the two-factor authentication process includes:

receiving a first codeword from a first group entity, storing the first codeword on a temporary storage on the auxiliary server, receiving a second codeword from the first group entity, and performing the two-factor authentication for each device associated with the first group entity based on matching the first codeword and the second codeword to a calculated hash value based on the first codeword and the second codeword;

after the matching the first codeword and the second codeword, receiving identification information for each entity of plurality of entities of the group independently from the at least one first transaction and second transaction, wherein the identification information is associated with the group transaction;

generating designated files for each device for each entity of the group transaction;

receiving separate partial deposit payments as first transactions by the passengers associated with the group booking to cover a deposit amount; and in response to receiving separate partial deposit payments as first transactions:

instructing the auxiliary server to update a total amount on a voucher object after each partial deposit payment has been received, wherein, in response to receiving a request to split the group, a group file on the application server and the temporary file on the auxiliary server are adapted to an intended split, and determining a reassociation between the group file to be split and a corresponding storage object on the temporary file by splitting the group file into two or more sub-group files with corresponding sub-group file identifiers, and splitting also the storage object into two sub-storage objects with corresponding sub-storage object identifiers, wherein each storage object is stored in a corresponding temporary file, and wherein the application server is configured to keep a one-to-one relationship between the sub-group file identifiers and the sub-storage object identifiers.

* * * * *